United States Patent [19]

Serinken

[11] Patent Number: 5,905,801
[45] Date of Patent: May 18, 1999

[54] FILE TRANSFER USING FACSIMILE MODEM

[75] Inventor: Nur M. Serinken, Ottawa, Canada

[73] Assignee: Her Majesty the Queen in Right of Canada, as represented by the Minister of Industry through the Communications Research Centre, Ottawa, Canada

[21] Appl. No.: 08/659,574

[22] Filed: Jun. 6, 1996

[51] Int. Cl.$^6$ .................................. H04L 9/00; H04L 9/30
[52] U.S. Cl. ................................. 380/51; 380/9; 380/10; 380/18; 380/30; 380/49; 380/55
[58] Field of Search ................................. 380/4, 5, 9, 10, 380/18, 30, 49, 50, 51, 54, 55, 59, 23, 25

[56] References Cited

U.S. PATENT DOCUMENTS

| 5,159,635 | 10/1992 | Wang | 380/51 |
|---|---|---|---|
| 5,245,655 | 9/1993 | Buhn et al. | 380/18 |
| 5,388,158 | 2/1995 | Berson | 380/23 |
| 5,541,993 | 7/1996 | Fan et al. | 380/18 |
| 5,596,640 | 1/1997 | Ohta | 380/18 |
| 5,652,794 | 7/1997 | Lepetit et al. | 380/18 |

*Primary Examiner*—Bernarr E. Gregory
*Attorney, Agent, or Firm*—Neil Teitelbaum & Associates

[57] ABSTRACT

A method is provided for transmitting and/or receiving files via a facsimile machine or computer fax modem. Electronic binary files residing on a computer, for example executable files, word processing files, database files and other types of files are converted to a machine readable binary bitmap in the form of a black and white bar code. Preferably the converted file is encrypted before being transmitted and printed. A receiving computer fax modem or facsimile machine can then print the file for later retransmission or storage, or a computer fax modem can reconstruct the file so that it can be used and/or executed after being received.

33 Claims, 6 Drawing Sheets

FILE TRANSFER USING FACSIMILE MODEM

FIELD OF THE INVENTION

This invention relates generally to document storage and transmission. More particularly this invention relates to electronic binary file transmission via telecopiers and storage adapted for placement in physical files.

BACKGROUND OF THE INVENTION

A common type of telecopier comprises a facsimile modem. Such a modem forms part of a personal computer or a computer network and provides telecopier functionality—sending electronic "telecopies" and receiving same. Electronic telecopies can be printed or transmitted to a telecopier. Some facsimile software provides optical character recognition to convert electronic telecopies (images) into electronic text. A facsimile modem is similar to a telecopier and can receive telecopies from a telecopier or transmit telecopies to a telecopier; however, a facsimile modem may lack a scanner or a printer.

A common method of transmitting electronic binary files uses a modem and a common communications protocol such as X-Modem or Z-Modem. In order to employ such a common communication protocol, a certain level of sophistication is desirable. Further, user intervention at both a transmitting and a receiving end are generally necessary.

In an attempt to overcome these problems, networks have been created. Such networks provide file copying and file access on a "server"—a central computer with electronic file storage. Such servers often pose the greatest security risk to computer networks and as such, dial up access to servers connected to a computer network is often limited or unavailable. Alternatively, where dial up access is provided, confidential information is not accessible and is not to be transferred using the server.

The use of telecopiers commonly referred to as facsimile machines is wide spread. Whereas several years ago, telecopiers were to be found in up-scale businesses and document based businesses, telecopiers can now be found in homes, hotels, small offices, brief cases, cars, personal digital assistants, and mailbox service stores. Telecopier transmissions can be sent via phone lines or via cellular and other wireless technologies.

The widespread use of telecopiers and facsimile modems has resulted in a general acceptance and understanding of their use. One such use of telecopiers is to transmit the content of physical documents and notes. These documents may be handwritten, those received from other sources or those which a sender does not wish a receiver to acquire as electronic text (or where the user does not know how to send an electronic file). These documents may be personal and/or confidential. Unfortunately, when the receiving telecopier is located at a hotel or in a mailbox service store, such confidentiality is lost. Further, when the document is to be sent from a mailbox service provider, the document is visible to said provider and to others using the service. Also, when a telecopy is transmitted to a facsimile modem residing in a server, such a telecopy is may be subject to unauthorized retrieval.

Presently, many offices have files stored electronically and on paper which are difficult to manage and, more importantly, are not truly equivalent. From the electronic files, a copy of the paper documents is generated through printing; however, from the paper documents, it is time consuming and difficult to generate electronic files. Further, it is often desirable to limit access to paper files. This is currently done using physical locking mechanisms. The disadvantages become apparent when access to some files is to be provided to several people while other files are only accessible to a subset and further files to a different group of people. File systems of this type are difficult to secure and often requires a person to maintain security.

Telecopiers have several conveniences over other forms of communication. A telecopy is a physical document likened to a letter. A telecopier can be programmed to send telecopies on a delayed schedule; this allows a user to take advantage of less expensive communication times. A telecopier receives telecopies absent user intervention. This last convenience is significant. Further, a telecopier functions independent of other electronic devices.

Many companies and individuals use telecopiers which are common to more than one person. Such telecopiers are often accessible to a number of people and may even be located in public areas. The ability to send a secure telecopy to such a telecopier is desirable.

In an attempt to overcome this problem, an apparatus is described in U.S. Pat. No. 5,491,563 by Pomerantz. The apparatus scrambles the visible telecopy to render it more difficult to read. Alignment indications are also transmitted with the scrambled telecopy in order to facilitate accurate re-assembly. Such scrambling suffers from several disadvantages. First, it suffers from data loss, printing errors, feed problems, and communication errors which are further aggravated by subsequent scanning, copying, telecopying. Second, it is applicable only to visual gray scale images.

In a further attempt to overcome this problem, an apparatus and method is described in U.S. Pat. Nos. 5,321,749 and 5,398,283 by Virga. The method comprises encrypting a bitmap of the image to be transmitted and transmitting the encrypted information as a series of marks indicative of "ones" and "zeros." From these marks, the encrypted bitmap is reconstructed, decrypted and capable of being printed as a telecopy. Alignment marks are placed at opposing ends of each line to compensate for misaligned transmissions. Such a telecopy is neither legible nor decipherable. Such scrambling suffers from several disadvantages. First, it suffers from data loss, printing errors, feed problems, and communication errors which are further aggravated by subsequent scanning, copying, telecopying. Second, it is applicable only to visual gray scale images.

It would be advantageous to provide means of storing electronic files as printed documents.

Further, it would be advantageous to provide means of sending electronic files from a facsimile modem to a telecopier or to another facsimile modem.

OBJECT OF THE INVENTION

Thus, in an attempt to overcome these and other limitations of known prior art devices, it is an object of this invention to provide a method and system for electronically storing documents in a printed form wherein the stored document is not legible to a person but may be decoded by an appropriate apparatus.

It is a further object of this invention to provide a method and system for electronically transmitting binary electronic files with a telecopier or a facsimile modem.

SUMMARY OF THE INVENTION

I. In accordance with the invention there is provided a method of providing a machine readable data output for transmission from a sending telecopier to a receiving telecopier or facsimile modem, comprising the steps of:

a) acquiring from a memory a binary electronic data file including text wherein each character is represented by predetermined number of contiguous binary bits and wherein a plurality of characters form predetermined words, wherein each word is formed of at least a character followed by a delimiter, said text being located, inside a body of the file and outside a header field within the file;

b) generating a machine readable visual representation of at least the body of the binary electronic file in a form of a bitmap of a machine readable bar code; and, c) printing said machine readable visual representation of the data file in the form of a bitmap of a machine readable bar code.

In accordance with the invention there is further provided, a method of providing a machine readable data output for transmission to a receiving facsimile machine or facsimile modem comprising the step of:

providing an electronic binary data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;

converting said binary data file to an H×W pixel array that is printable and printing said array, the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state.

BRIEF DESCRIPTION OF THE DRAWINGS

Exemplary embodiments of the invention will now be described in conjunction with the following drawings, in which.

DETAILED DESCRIPTION

It is desirable to store printed documents in a secure fashion. This security has historically only referred to secure locations from fire, damage, and unauthorized access. It is now apparent that security of file documents includes security for the printed document in the file. The invention herein described allows a secure printed document to be placed in a file that is semi-publicly accessible. The method also allows such a document to be sent via telecopier, copied, or stored on paper for later retrieval.

It is also desirable to facilitate communication of electronic files. A method according to this invention, allows electronic files to be transmitted via telecopier or facsimile modem. A receiving device can be a telecopier or a computer having a facsimile modem attached thereto. Neither of these receiving devices is required to be attended during reception.

Figure 1:
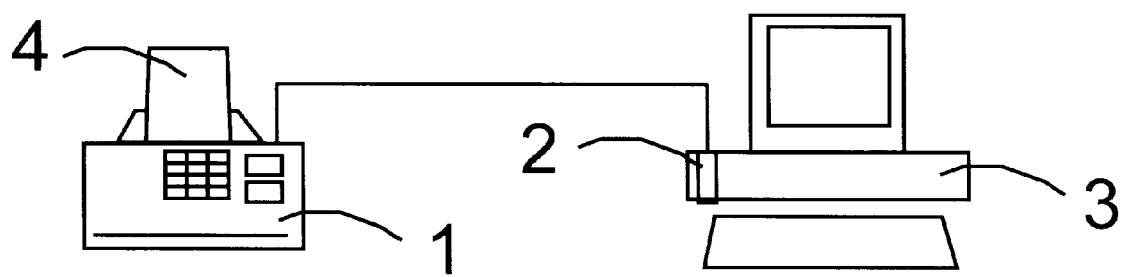
FIG. 1 is a simplified diagram of a telecopier and a personal computer with a facsimile modem.

Referring to FIG. 1, a computer 1 with an attached printer 3 is shown. The computer sends a document comprising electronic data representative of a binary electronic file to the printer 3. A printout is generated representative of the file. Said printout is neither legible nor decipherable without appropriate software. Alternatively, the file is also encrypted and decryption information is required in order to decipher the file.

Figure 2:
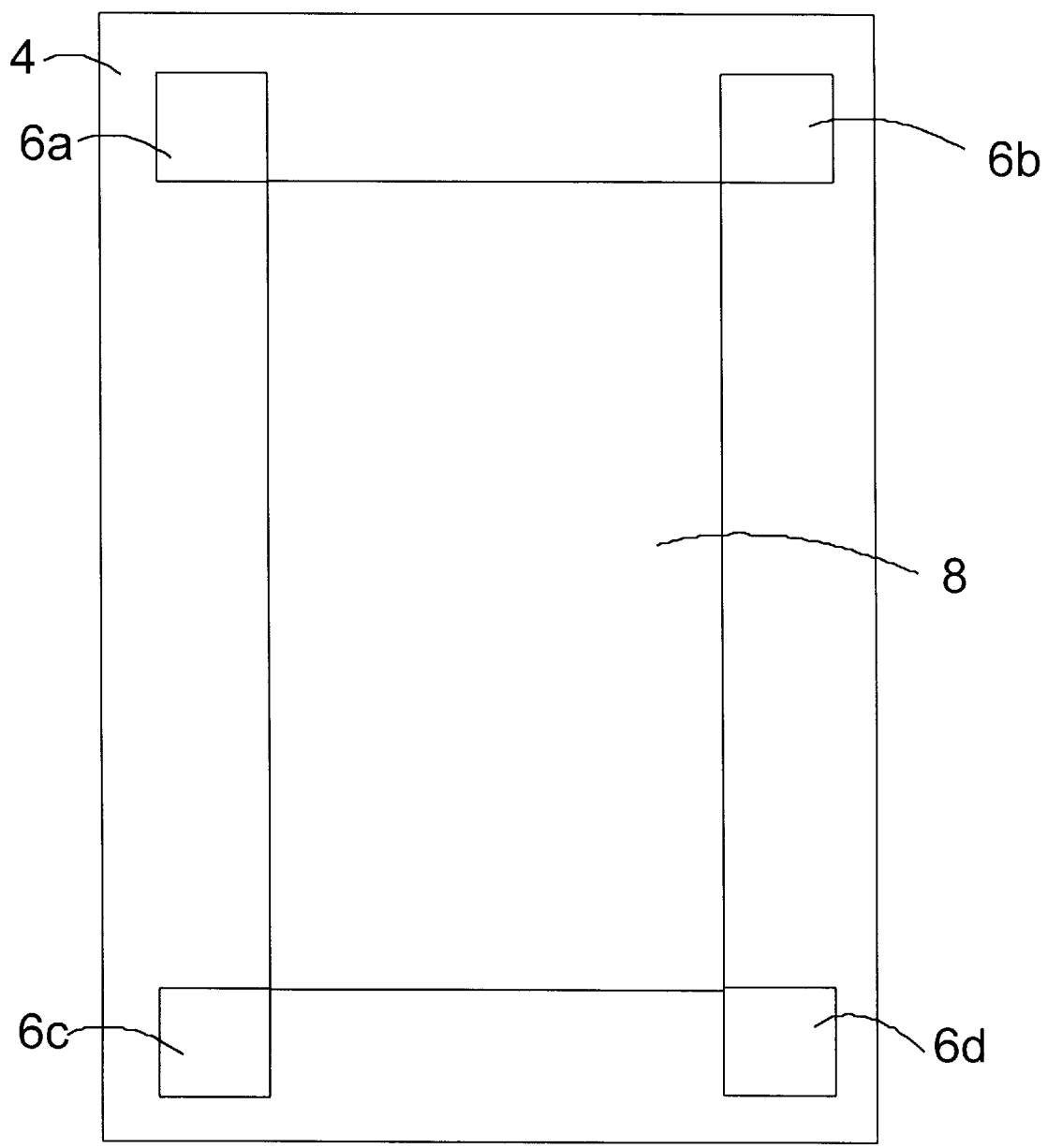
FIG. 2 is an example of an encoded telecopy according to this invention.

Referring to FIG. 2, a printout 4 according to this invention is shown. At each corner thereof, a predetermined corner indicator indicated as each of 6a, 6b, 6c, and 6d is transmitted. The corner indicators allow for paper feed errors and copying or transmission by providing alignment indications to a decoder. The main body 8 of the printout 4 contains a two dimensional bar-code representation of the binary data file printed.

Figure 3:
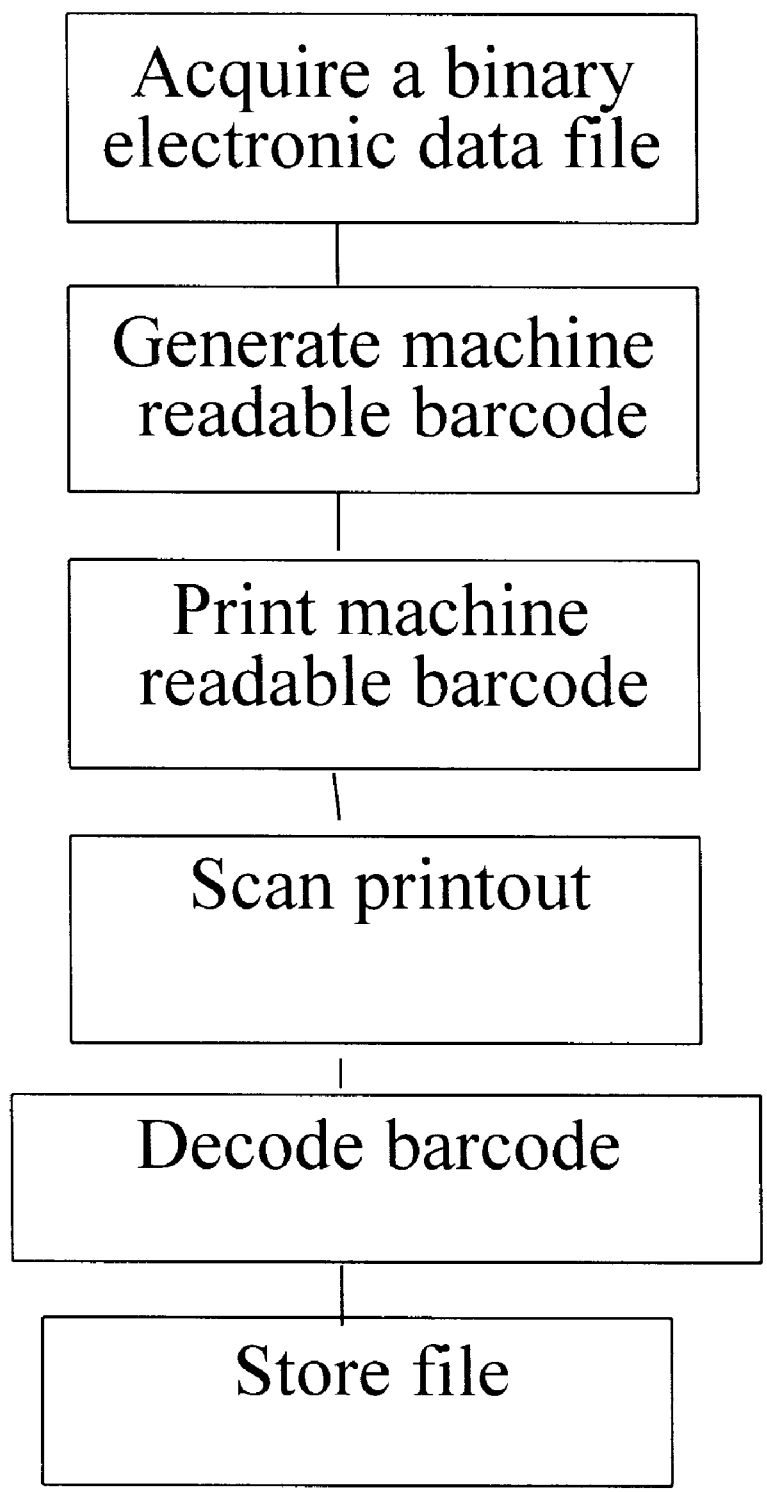
FIG. 3 is a flow chart of a method according to this invention.

The series of steps followed to generate the printout of FIG. 2 is shown in FIG. 3. An electronic file representing an image, text, an executable, configuration information, or any other binary electronic file is transformed into a two dimensional bar code. Each printout page contains a page number, alignment marks 6 in the form of corner locators, and a body 8 comprising approximately 100 kilobytes of information. The page number allows the reconstruction of the file when multiple pages are decoded out of order. The alignment marks 6 have been described previous and the body 8 contains the complete file, or a portion thereof.

Upon examination of FIG. 2, it is clear that a person reviewing the printout can not read same. In order to use the electronic file, a person scans the document into a computer, and reconstructs the electronic file. Decryption is performed where necessary and the file once completely decoded contains the same information as the original file. The file can be executed, printed, viewed, or edited. A file can be transported on paper and scanned into a computer at a destination without fear of security breach. The printouts can be mailed, faxed, copied, or hand carried. When faxed, the document can be re-transmitted several times without affecting reconstruction.

Figure 4:
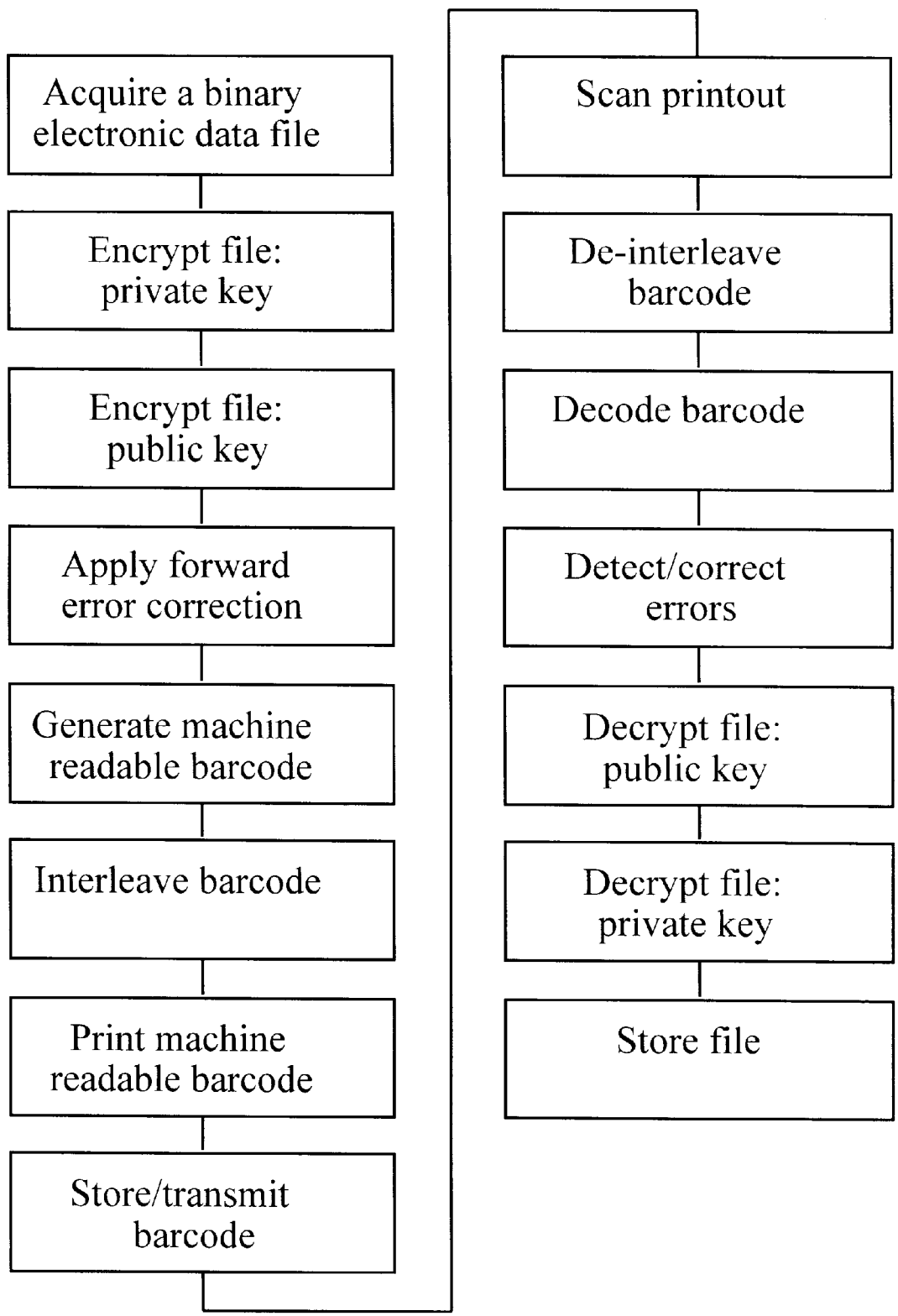
FIG. 4 is a flow chart of a preferred embodiment of a method according to this invention.
Figure 5:
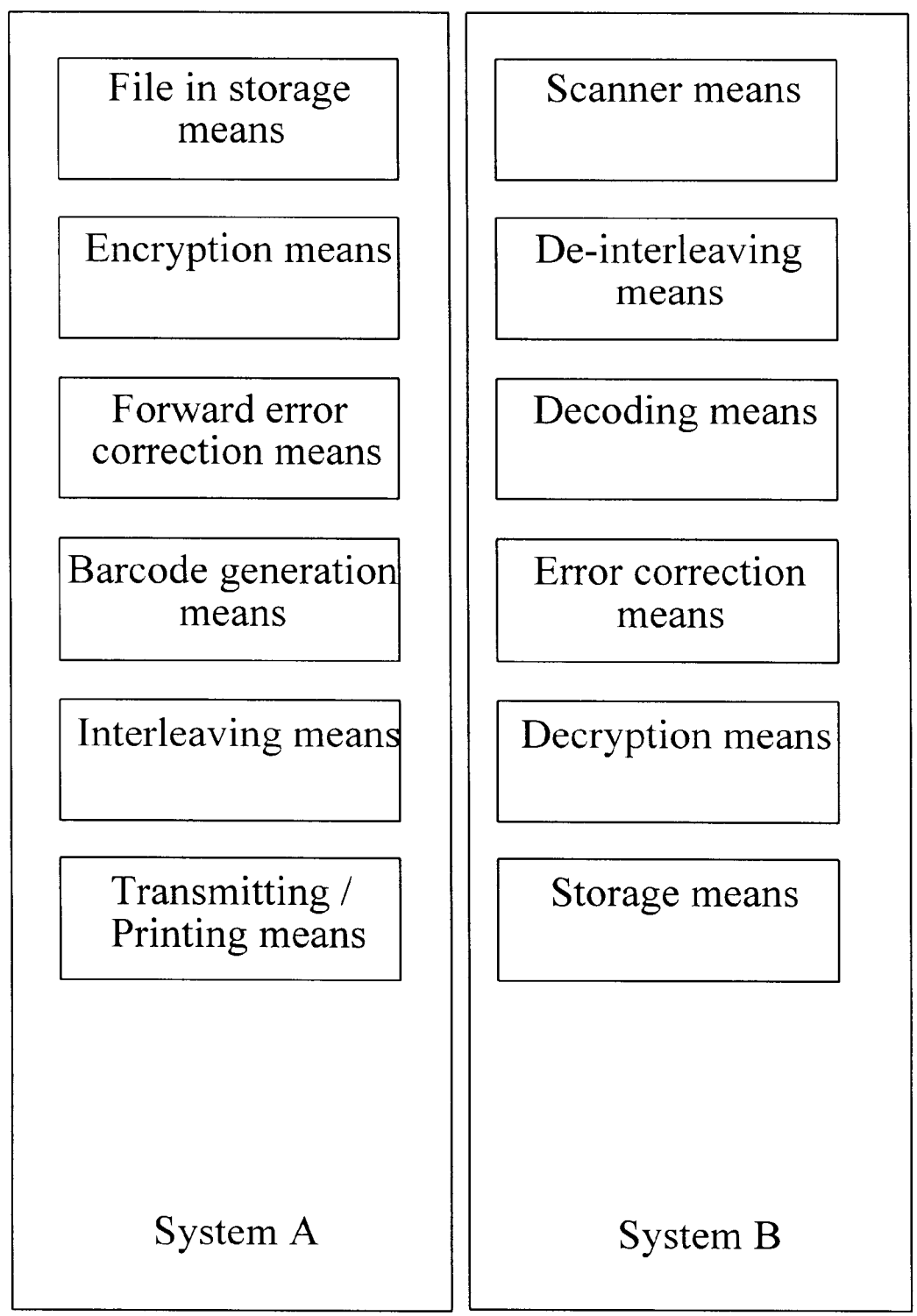
FIG. 5 is a block diagram of a preferred embodiment of a method according to this invention; and, FIG. 6 is a block diagram of a further embodiment of a method of transmitting and receiving electronic files using facsimile modems according to this invention.

An embodiment for printing and reconstructing a file is further described with reference to FIG. 4. The four corner locators 6a, 6b, 6c, and 6d of the printout are mapped from a two dimensional binary matrix into a 2D image, each element of the matrix is represented as a generally square mark for the two binary states of the matrix elements, a white or a black mark is used to represent a binary state of the locator matrix element. The locators are designed to have a ratio of 0.5 for binary ones to zeros of the locator matrix. The choice of the contents of the matrix is such that when the locator is correlated with an exact template of itself a high ratio of correlation results. When the template is shifted in any possible direction or rotated over the target locator, the correlation ratio is significantly reduced. This choice of values for the locator matrix provides an accurate registration of the four corners of the bar-code and avoids false registration of corners. Every bit of the locator is preferably mapped into an L1×L2 mark (where L1 and L2 are dimensions in pixels) to increase tolerance to distortion introduced when the image is printed and scanned or transmitted.

It has been found that some corner locator matrices provide better results than others. These are evaluated using a pseudo random algorithm that maintains the ratio of 0.5. After each pass, the results are evaluated for correlation and the matrix having best results (greatest difference between correlation when correctly located and oriented and correlation when improperly located and oriented) is selected for use with the system. One such matrix is shown in FIG. 2.

The body of the bar-code carries the information from the binary file and is generated by the following steps: A file that is to be stored according to the present invention is encrypted once or twice (depending on user requests for signature and encryption for privacy). The output of encryption is fed into a forward error correction coding step. Such a forward error correction step is known and uses a known algorithm such as Reed Solomon. The forward error correction coded output is divided into sections allowing each section to fit into one page of bar-code space. For each page of the bar-code, a digital code of page number and transaction number is appended. This is to prevent incorrect reconstruction of the file when the bar-code pages are out of sequence during decoding.

A common method of encryption requires the use of two keys. A private key is accessible only to the a user or a limited group of users. A public key is available generally and is used for the public aspect of the encryption. Two uses of such a system will now be described. When a user wishes to send encrypted information that only a limited number of users can access, that user encrypts the the information with a public key. Individuals having a corresponding private key can decrypt said information. Alternatively, when a user wishes to authenticate information as originating from said user, a private key is used to encrypt the information. The public can decrypt the information using a corresponding public key. Information may be encrypted twice to authenticate the sender and protect the information from unauthorized access.

The binary data is then interleaved. The interleaving operation is performed in a predetermined and predictable fashion and distributes errors introduced during scanning, copying, or transmission into many code words rather than concentrating the errors into a few code words. The errors can be due to accidental coffee spills, staple holes, channel noise, communication synchronisation problems, printing problems, dirt introduced by the printer, ageing, folding, and a variety of other sources. This interleaving operation is selected to minimize error effects and maximize the efficiency of the forward error correction algorithm employed. The interleaved data is converted into binary marks (black or white) of K1×K2 pixels, this operation is similar to mapping of locator bits.

The values K1 and K2 do not have to equal L1 and L2 respectively.

Reconstruction

After scanning a printout into a computer, the position of the locators is determined. The determination is made starting from an estimated location for the bottom left locator 6c and performing correlations between known data and an area about each of a variety of locations and rotations until a best location is determined. This best location is refered to as in registry as the locator is registered with the known data. After the detection of the bottom left locator 6c other locator co-ordinates are determined beginning at an estimated location for each of the remaining locators. A two dimensional sampling grid is constructed with the locator co-ordinates as corners thereof. The sampling grid is constructed substantially accurately in the absence of a locator or possibly two. If a skew or scaling of the bar-code was introduced from printing and scanning operations the sampling grid compensates for these distortions. Such compensation is best when all four locators are located. For the ideal case of no distortion the sampling grid reads the centre pixel value of each K1×K2 mark.

When distortions have occurred but the location of the locators are accurate to within a few pixels of the original location the sampling point specified in the grid falls within each K1×K2 mark absent correction for distortion. The data that is read has an n-bit value used for soft decision decoding of the forward error correction operation. The soft decision decoding operation improves error correcting ability of error correction code. Samples of a decoded image are de-interleaved in an inverse transformation of that used in forming the interleaved data, then error correction is applied. The output of the error correction is decrypted in order to recover information from the original binary data file transmitted. The information decoded from each of multiple bar-code pages is concatenated in correct sequence to build an output file.

Alternatively, the bar-code contains information relating to the contents of the printout. Such information comprises the name of the originator, the file reference, the name of the binary electronic file, the number of pages, number of bytes of information, if the contents are digitally signed or encrypted or both, date and time of creation of the printout, session number and other information. This information is used in the decoding operation for selection of the keys and other related tasks performed during reconstruction.

The size of the bar-code, H×W, is under the control of the software and can be altered through a configuration file. The percent redundancy for the forward error correction, the size of the locator marks L1 and L2 and data marks K1 and K2 values are also read from the same configuration file. Preferably, these values are stored integrally with a printout such that reconstruction can be achieved on any system having correct algorithms and decryption keys.

Once the printouts are printed, the printouts can be imported into a system via scanner means. The printouts are capable of being transmitted several times by telecopier prior to the binary electronic file's reconstruction. The number of intermediate copies without data loss depends upon the mark size (K1 and K2) and the quality of the copies. The trade off is between the amount of data that can be fit into a single page and the number of intermediate copies possible. Using smaller values of K1 and K2, results in documents which can only be transmitted a few times if at all. This may be desirable.

Figure 6:
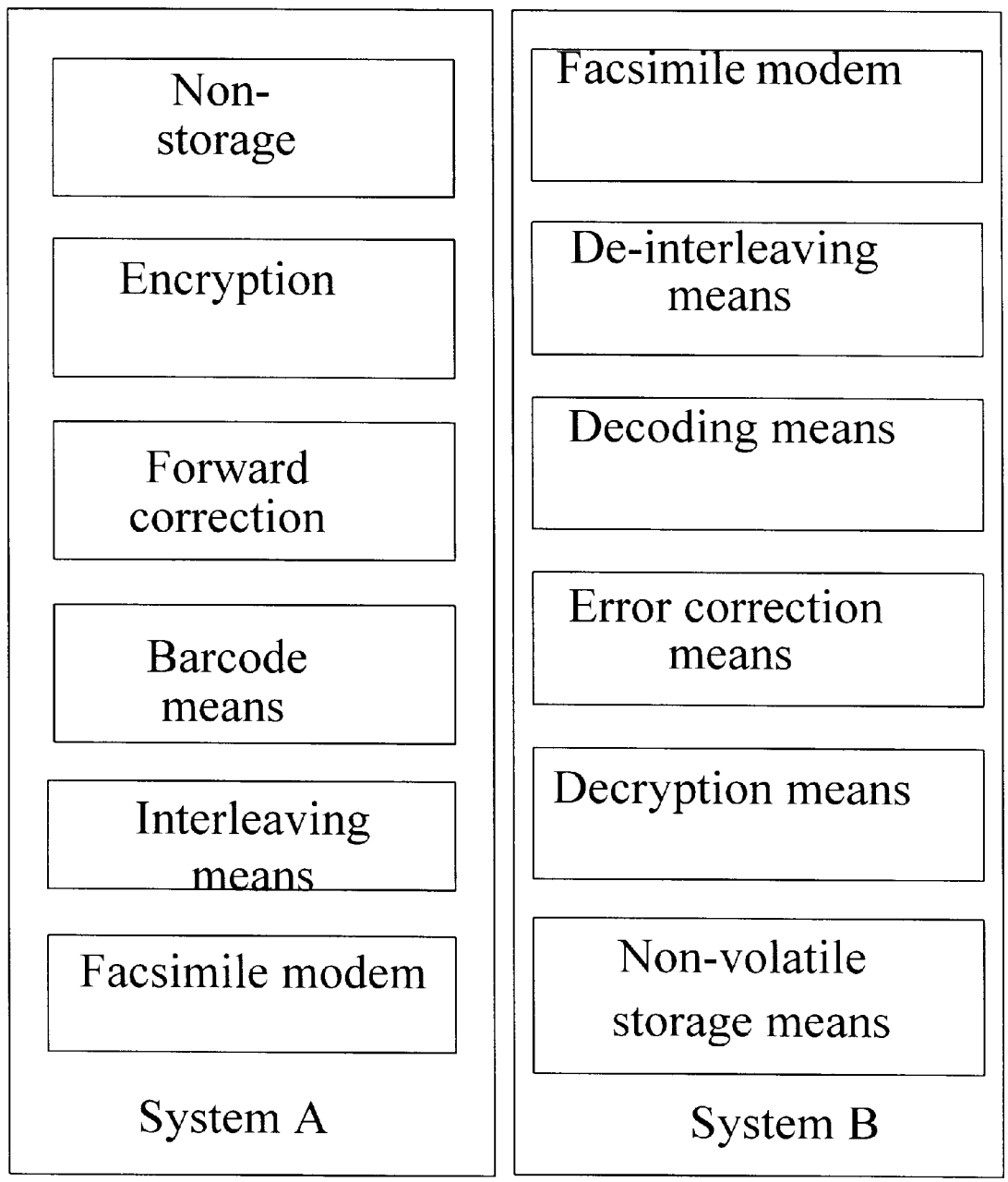

Referring to FIG. 6, a computer 1 provided with a facsimile modem 100 is shown in communication with a facsimile modem 102 contained within a second computer 103. The facsimile modem 102 originates a communication and transmits a telecopy of electronic data representative of a binary electronic file to the computer 1 provided with a facsimile modem 100. The telecopy received at the computer 1 provided with a facsimile modem 100 is an electronic bitmap of an image similar to the printout 4 shown in FIG. 2. Alternatively, the receiving apparatus is in the form of a telecopier. In such alternative embodiment, the received telecopy is printed and is similar to the printout 4 shown in FIG. 2.

The series of steps followed to generate the transmission is shown in FIG. 3. An electronic file is transformed into a two dimensional bar code. The bar code is divided up into segments capable of being printed on a page. Each page comprises a page number, alignment marks 6 in the form of corner locators, and a body 8 comprising approximately 100 kilobytes of information. The page number allows the reconstruction of the file when multiple pages are decoded out of order. The alignment marks 6 have been described previous and the body 8 contains the complete file, or a portion thereof. Each page is capable of being transmitted as a telecopy page or printed as a printout. When using telecopiers to transmit information, the use of alignment marks is highly desirable.

In order to reconstruct the document, the recipient computer reconstructs the electronic file. Decryption is performed where necessary and the file once completely decoded contains the same information as the original file transmitted. The file can be executed, printed, viewed, or edited. A document can be re-transmitted several times without affecting reconstruction. Alternatively, the printed telecopy must be scanned into the computer prior to reconstruction.

The embodiment shown in FIG. 6 allows transmission of electronic files from one computer to another without requiring attention at the receiving computer. Further, the electronic file is sent as a facsimile and thus, the method does not requires a user to have extensive computer knowledge. Finally, the use of a common transmission protocol for facsimiles and electronic files provides a more consistent user interface.

Numerous other embodiments may be envisaged without departing from the spirit and scope of the invention.

What I claim is:

1. A method of providing a data output for transmission from a sending telecopier to a receiving telecopier or facsimile modem, comprising the steps of:
   a) providing a binary electronic data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;
   b) generating a bitmap of a two-dimensional bar code relating to at least the body of the binary electronic file; and,
   c) printing said bar code, wherein the bar code further comprises at least an alignment indicator.

2. A method of providing a data output as defined in claim 1 wherein the at least an alignment indicator is comprised of approximately 50% black marks and has a high auto-correlation and a low cross correlation when the target and a template are in registry and a low auto-correlation when the template is out of registry.

3. A method of providing a data output for transmission from a sending telecopier to a receiving telecopier or facsimile modem, comprising the steps of:
   a) providing a binary electronic data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;
   b) generating a bitmap of a two-dimensional bar code relating to at least the body of the binary electronic file;
   c) printing said bar code; and,
   applying a forward error correction operation to the binary data file.

4. A method of providing a data output for transmission from a sending telecopier to a receiving telecopier or facsimile modem, comprising the steps of:
   a) providing a binary electronic data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;
   b) generating a bitmap of a two-dimensional bar code relating to at least the body of the binary electronic file;
   c) printing said bar code; and, encrypting the binary data file wherein the encryption is performed with at least a private key so an encoded digital representation of the data file includes a digital signature that can be decrypted with at least a public key.

5. A method of providing a data output for transmission from a sending telecopier to a receiving telecopier or facsimile modem, comprising the steps of:
   a) providing a binary electronic data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;
   b) generating a bitmap of a two-dimensional bar code relating to at least the body of the binary electronic file;
   c) printing said bar code: and,
      encrypting the binary data file wherein encryption is performed with at least a public key so that an encoded digital representation of the data file includes a level of privacy, the encrypted data file being decryptable with at least a corresponding private key.

6. A method of providing a data output for transmission from a sending telecopier to a receiving telecopier or facsimile modem, comprising the steps of:
   a) providing a binary electronic data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;
   b) generating a bitmap of a two-dimensional bar code relating to at least the body of the binary electronic file;
   c) printing said bar code; and,
      encrypting the binary data file wherein the encryption is performed with at least a private key so an encoded digital representation of the data file includes a digital signature that can be decrypted with at least a public key.

7. A method of providing a data output for transmission from a sending telecopier to a receiving telecopier or facsimile modem, comprising the steps of:

a) providing a binary electronic data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;

b) generating a bitmap of a two-dimensional bar code relating to at least the body of the binary electronic file;

c) printing said bar code;

scanning the barcode into a computer; and reconstructing the binary electronic file in dependence upon the bar code.

8. A method of providing a data output for transmission from a sending telecopier to a receiving telecopier or facsimile modem, comprising the steps of:

a) providing a binary electronic data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;

b) generating a bitmap of a two-dimensional bar code relating to at least the body of the binary electronic file; and, c) printing said bar code, wherein the binary data file is not a bitmap file.

9. A method of providing a data output for transmission to a receiving facsimile machine or facsimile modem comprising the step of:

providing an electronic binary data file including text wherein each character is represented by a predetermined number of contiguous binary bits and wherein a plurality of characters form predetermined words, wherein each word is formed of at least a character followed by a delimiter, said text being located, inside a body of the file and outside a header field within the file; and, converting said binary data file to an H×W pixel array that is printable and printing said array, H and W each greater than one and the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state, wherein one or more black or white rectangles represents a binary data bit from the binary data file.

10. A method of providing a data output for transmission to a receiving facsimile machine or facsimile modem comprising the step of:

providing an electronic binary data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;

converting said binary data file to an H×W pixel array that is printable and printing said array, H and W each greater than one and the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state; and, providing indicia adjacent to the H×W pixel array for registering with a predetermined template and for aligning said H×W pixel array to facilitate decoding of the converted pixel array.

11. A method of providing a data output as defined in claim 10 wherein the at least an alignment indicator is comprised of approximately 50% black marks and has a high auto-correlation and a low cross correlation when the target and a template are in registry and a low auto-correlation when the template is out of registry.

12. A method of providing a data output for transmission to a receiving facsimile machine or facsimile modem comprising the step of:

providing an electronic binary data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;

converting said binary data file to an H×W pixel array that is printable and printing said array, H and W each greater than one and the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state; and, applying a forward error correction operation to the binary data file.

13. A method of providing a data output for transmission to a receiving facsimile machine or facsimile modem comprising the step of:

providing an electronic binary data file including text wherein each character is represented by a predetermined number of contiguous binary bits and wherein a plurality of characters form predetermined words, wherein each word is formed of at least a character followed by a delimiter, said text being located inside a body of the file and outside a header field within the file;

converting said binary data file to an H×W pixel array that is printable and printing said array, H and W each greater than one and the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state; and, encrypting the binary data file wherein the encryption is performed with at least a private key so an encoded digital representation of the data file includes a digital signature that can be decrypted with at least a public key.

14. A method of providing a data output for transmission to a receiving facsimile machine or facsimile modem comprising the step of:

providing an electronic binary data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;

converting said binary data file to an H×W pixel array that is printable and printing said array, H and W each greater than one and the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state; and, interleaving the bitmap.

15. A method of providing a binary data output for transmission to a receiving facsimile machine or facsimile modem comprising the step of: providing an electronic binary data file including text wherein each character is represented by a predetermined number of contiguous binary bits and wherein a plurality of characters form predetermined words, wherein each word is formed of at least a character followed by a delimiter, said text being located, inside a body of the file and outside a header field within the file; and, converting said binary data file to an H×W pixel array that is printable and printing said array, H and W each greater than one and the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state, wherein the binary data file is a binary executable file.

16. A method of providing a data output for transmission to a receiving facsimile machine or facsimile modem comprising the step of:

providing an electronic binary data file including text wherein each character is represented by a predetermined number of contiguous binary bits and wherein a plurality of characters form predetermined words, wherein each word is formed of at least a character followed by a delimiter, said text being located, inside a body of the file and outside a header field within the file;

converting said binary data file to an H×W pixel array that is printable and printing said array, H and W each greater than one and the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state;

scanning the bar code into a computer; and reconstructing the binary electronic file in dependence upon the bar code.

17. A method of providing a data output for transmission to a receiving facsimile machine or facsimile modem comprising the step of:

providing an electronic binary data file including text wherein each character is represented by a predetermined number of contiguous binary bits and wherein a plurality of characters form predetermined words, wherein each word is formed of at least a character followed by a delimiter, said text being located, inside a body of the file and outside a header field within the file; and, converting said binary data file to an H×W pixel array that is printable and printing said array, H and W each greater than one and the converted binary data file being in the form of a binary H×W pixel bitmap comprising black and white indicia representing two binary states, wherein one or more contiguous pixels in a first state represent a "1" or a "0" binary data bit of the binary data file, and where one or more contiguous pixels in a second binary state represent a binary "0" or a "1" data bit of the binary data file, the second binary state being opposite from the first binary state, wherein the binary data file is not a bitmap file.

18. A method of providing a data transmission from a sending facsimile modem, comprising the steps of:

a) providing a binary electronic data file including text wherein each character is represented by predetermined number of contiguous binary bits and wherein a plurality of characters form predetermined words, wherein each word is formed of at least a character followed by a delimiter, said text being located, inside a body of the file and outside a header field within the file;

b) generating a bitmap of a two-dimensional bar code relating to the binary electronic file;

c) transmitting via facsimile modem said bitmap of a bar code;

receiving the transmitted bitmap with a receiving facsimile modem; and reconstructing the binary electronic file in dependence upon the received bitmap.

19. A method of providing a data output for transmission from a sending facsimile modem, comprising the steps of:

a) providing a data file associated with at least a computer application not associated with electronic data transmission;

b) generating a bitmap of a bar code representing the data file;

c) transmitting via facsimile modem said bitmap of a bar code;

d) receiving the transmitted bitmap with a receiving facsimile modem;

e) reconstructing the data file in dependence upon the received bitmap;

accessing the data file with at least an associated computer application; and, applying a forward error correction operation to the data data file.

20. A method of providing a data output for transmission from a sending facsimile modem, comprising the steps of:

a) providing a data file associated with at least a computer application not associated with electronic data transmission;

b) generating a bitmap of a bar code representing the data file;

c) transmitting via facsimile modem said bitmap of a bar code;

d) receiving the transmitted bitmap with a receiving facsimile modem;

e) reconstructing the data file in dependence upon the received bitmap;

accessing the data file with at least an associated computer application; and, interleaving the data file.

21. A method of providing a data output for transmission from a sending facsimile modem, comprising the steps of:

a) providing a data file associated with at least a computer application not associated with electronic data transmission;

b) generating a bitmap of a bar code representing the data file;

c) transmitting via facsimile modem said bitmap of a bar code;

d) receiving the transmitted bitmap with a receiving facsimile modem;

e) reconstructing the data file in dependence upon the received bitmap;

accessing the data file with at least an associated computer application; and, providing locators in the form of indica adjacent to the bar code within the bitmap for registering with a predetermined template and for aligning said bitmap to facilitate decoding of the bitmap.

22. A method of providing a data output as defined in claim 21 wherein the locators comprise approximately 50% black and 50% white information and have a high auto-correlation and a low cross correlation when the target and a template are in registry and have a low auto-correlation when the template is out of registry.

23. A method of providing a data transmission from a sending facsimile modem, comprising the steps of:

a) providing an executable file associated with at least a computer;

b) generating a bitmap of a bar code representative of the executable file;

c) transmitting via facsimile modem said bitmap of a bar code;

d) receiving the transmitted bitmap with a receiving facsimile modem;

e) reconstructing the executable file in dependence upon the received bitmap;

executing the reconstructed executable file; and, applying a forward error correction operation to the executable file.

24. A method of providing a data transmission from a sending facsimile modem, comprising the steps of:

a) providing an executable file associated with at least a computer;

b) generating a bitmap of a bar code representative of the executable file;

c) transmitting via facsimile modem said bitmap of a bar code;

d) receiving the transmitted bitmap with a receiving facsimile modem;

e) reconstructing the executable file in dependence upon the received bitmap;

executing the reconstructed executable file; and, interleaving the executable file.

25. A method of providing a data transmission from a sending facsimile modem, comprising the steps of:

a) providing an executable file associated with at least a computer;

b) generating a bitmap of a bar code representative of the executable file;

c) transmitting via facsimile modem said bitmap of a bar code;

d) receiving the transmitted bitmap with a receiving facsimile modem;

e) reconstructing the executable file in dependence upon the received bitmap;

executing the reconstructed executable file; and, providing locators in the form of indica adjacent to the bar code representative of the executable file for registering with a predetermined template and for aligning said bar code to facilitate decoding of the bar code.

26. A method of providing a data output as defined in claim 25 wherein the locators comprise approximately 50% black and 50% white information and have a high auto-correlation function and a low cross correlation when the target and a template are in registry and a low auto-correlation when the template is out of.

27. A method of storing electronic data on printed media comprising the steps of:

a) providing a binary electronic data file including text wherein each character is represented by predetermined number of contiguous binary bits and wherein a plurality of characters form predetermined words, wherein each word is formed of at least a character followed by a delimiter, said text being located, inside a body of the file and outside a header field within the file;

b) generating a bitmap of a two-dimensional bar code representing at least the body of the binary electronic file;

c) printing said bitmap of a bar code;

d) scanning the printed bitmap with an imaging means;

e) reconstructing the binary electronic data file in dependence upon the scanned bitmap; and f) accessing the binary electronic data file with at least an associated computer application.

28. A method of storing electronic data on printed media comprising the step of:

a) providing a binary electronic data file including text wherein each character is represented by predetermined number of contiguous binary bits and wherein a plurality of characters form predetermined words, wherein each word is formed of at least a character followed by a delimiter, said text being located, inside a body of the file and outside a header field within the file;

b) generating a bitmap of a two-dimensional bar code representing at least the body of the binary electronic file;

c) printing said bitmap of a bar code; and, providing locators in the form of indica adjacent to the barcode of at least the body of the binary electronic file for registering with a predetermined template and for aligning said barcode to facilitate decoding of same.

29. A method of providing a machine readable data output as defined in claim 28 wherein the locators comprise approximately 50% black and 50% white information and have a high auto-correlation function and a low cross correlation when the target and a template are in registry and a low auto-correlation when the template is out of.

30. A method of storing electronic data on printed media comprising the steps of:
   a) providing a data file, the data file associated with at least a computer application not associated with electronic data transmission;
   b) generating a bitmap of a two-dimensional bar code representing the data file;
   c) printing said bitmap of a bar code;
   d) scanning the printed bitmap with an imaging means;
   e) reconstructing the data file in dependence upon the scanned bitmap; and
   f) accessing the data file with at least an associated computer application.

31. The method of storing electronic data on printed media as defined in claim 29 wherein the encryption used provides authentication of the originator of the encrypted data file.

32. The method of storing electronic data on printed media as defined in claim 29 wherein the encryption used provides security against unauthorized access to the data file.

33. A method of storing electronic data on printed media comprising the steps of:
   a) providing a data file, the data file associated with at least a computer application not associated with electronic data transmission;
   b) generating a bitmap of a two-dimensional bar code representing the data file;
   c) printing said bitmap of a bar code;
   d) encrypting the data file prior to generating a bitmap of a bar code representative thereof;
   e) scanning the printed bitmap with an imaging means;
   f) reconstructing the encrypted data file in dependence upon the scanned bitmap; and
   g) decrypting the encrypted data file to produce a data file.

* * * * *

UNITED STATES PATENT AND TRADEMARK OFFICE
CERTIFICATE OF CORRECTION

PATENT NO. : 5,905,801
DATED : May 18, 1999
INVENTOR(S) : Serinken

It is certified that error appears in the above-identified patent and that said Letters Patent is hereby corrected as shown below:

Col. 15, line 4, the word "registry" is missing from the end of the claim

Signed and Sealed this

Fourth Day of January, 2000

Attest:

Attesting Officer

*Acting Commissioner of Patents and Trademarks*